MANUAL DATA ENTRY DEVICE

Filed Dec. 21, 1966 2 Sheets-Sheet 1

INVENTORS
JOSEPH J. EACHUS
CHARLES L. BAGNASCHI
BY
ATTORNEY

MANUAL DATA ENTRY DEVICE

Filed Dec. 21, 1966 2 Sheets-Sheet 2

INVENTOR
JOSEPH J. EACHUS
CHARLES L. BAGNASCHI
BY Henry L. Hanson
ATTORNEY

United States Patent Office 3,469,242
Patented Sept. 23, 1969

3,469,242
MANUAL DATA ENTRY DEVICE

Joseph J. Eachus, Cambridge, and Charles L. Bagnaschi, Braintree, Mass., assignors to Honeywell Inc., Minneapolis, Minn., a corporation of Delaware Filed Dec. 21, 1966, Ser. No. 603,646
Int. Cl. G11c *11/06*
U.S. Cl. 340—172.5 9 Claims

ABSTRACT OF THE DISCLOSURE

Data entry apparatus generates digital information relating to the identification of one or more manual selections made on a pictorial representation of a number of different items projected directly on the entry portion of the apparatus. The entry portion of the apparatus takes the form of a planar surface having an array of bistable elements positioned therein. Each bistable element is positionally located in the array so as to be only associated with an area corresponding to a single one of the items. A selection probe is used for selecting the different items by placing it adjacent the particular bistable element associated with the item. This is effective to partially switch the bistable element. The array of elements is scanned and the associated apparatus is operative to produce a unique output digital signal in the form of an array address to identify each partially switched element in the array. The apparatus is arranged so that the array and assciated circuitry store a momentary selection until the apparatus is cleared.

BACKGROUND OF THE INVENTION

The invention relates to input data processing apparatus and more particularly to a keyless data entry device for generating digital information in accordance with one or more unique positional selections.

In the past, many types of manual keyboard devices have been developed to enable a human operator to communicate freely with associated automatic apparatus, such as data processing apparatus. Generally, these keyboard devices by which the communication takes place are complex, expensive, and require a great degree of skill if the communication is to be carried out expeditiously and accurately. It has been found that a more rapid, economical and accurate means of selection may be accomplished by pointing to specific items in contrast to making a plurality of key selections to identify the item desired to be encoded for use in the associated apparatus. Such latter means which may utilize this principle of operation usually involve an arrangement wherein a probe or penlike stylus is used to make contact with some type of writing surface. The writing surface may be either a cathode ray tube or a tablet surface. In the case of a cathode ray tube, a light-sensitive element in the pen generates a signal when the flying spot on the tube surfaces reaches the pen tip and the timing of the signal, relative to the time of the scanning pattern, establishes the pen position. In the tablet arrangement, an array of etched lines in an X and Y direction are provided and to these lines a unique voltage pulse train is applied from a common pulse pattern generator. The pen acts as an electrostatic pick-up connected to a high input impedance amplifier such that the pulse train picked up by the pen depends on the X and Y lines nearest to its tip. In arrangements of this type the pen is utilized as the signal pick-up device and the writing surface as the signal generator.

It has been found that arrangements of the above prior art type require a large amount of complex electronics for the generation of appropriate pulse sequences and for the conversion of detected pulse sequences into digital addresses. More importantly, devices of this type must provide additional storage means because of the nature of the selection surface arrangement for retaining the digital coordinate information relative to the selections entered by the operator. In summary, the above devices have been found to be useful in display systems for giving the operator the facility of drawing and performing a simple geometrical operation on whatever the operator is observing by employing a probe for indicating an operator's selection. However, such devices do not particularly lend themselves to a rapid, economical means of storing one or more of a plurality of probe selections until such time as the operator deems that the selection phase has been completed without introducing additional storage means.

SUMMARY OF THE INVENTION

By way of summary, it is an object of the invention to provide new apparatus wherein a relatively inexperienced operator can make one or more of a plurality of selections quickly and efficiently and such apparatus will produce a digital indication of the selection made.

It is a further object to provide a new and improved input keyless data entry device of inexpensive construction wherein a human operator can effectively make one or more of a plurality of selections each identifiable with a particular one of a plurality of different items.

It is still a further object to provide a data entry device wherein automatic storage of one or more selections is provided without requiring any additional circuitry beyond the selection sensing elements.

These and other objects are accomplished in one embodiment of the invention by an array of bistable elements wherein probe selection means are provided for altering the state thereof. Each element is sequentially interrogated and upon the sensing of a change in state, the corresponding address is transferred to an output means. By adapting associated circuitry to restore only those bistable elements whose states have not been altered by selections to their original state, the apparatus is effectively able to maintain a record of prior selections until all such selections have been made by an operator. In accordance with the particular invention, the digital signals used for interrogation are also arranged to be indicative of the positional location of each of the elements. Thus, the same digital signals may be used for the automatic encoding of signals uniquely identifying the selected elements.

The foregoing objects and features of novelty which characterize the invention, as well as other objects of the invention are pointed out with particularity in the claims annexed to and forming a part of the subject specification. For a better understanding of the invention, its advantages and specific objects attained with its use, reference should be had to the accompanying drawings and descriptive matter in which there is illustrated and described a preferred embodiment of the invention.

DESCRIPTION OF THE PREFERRED EMBODIMENT

Figure 1:
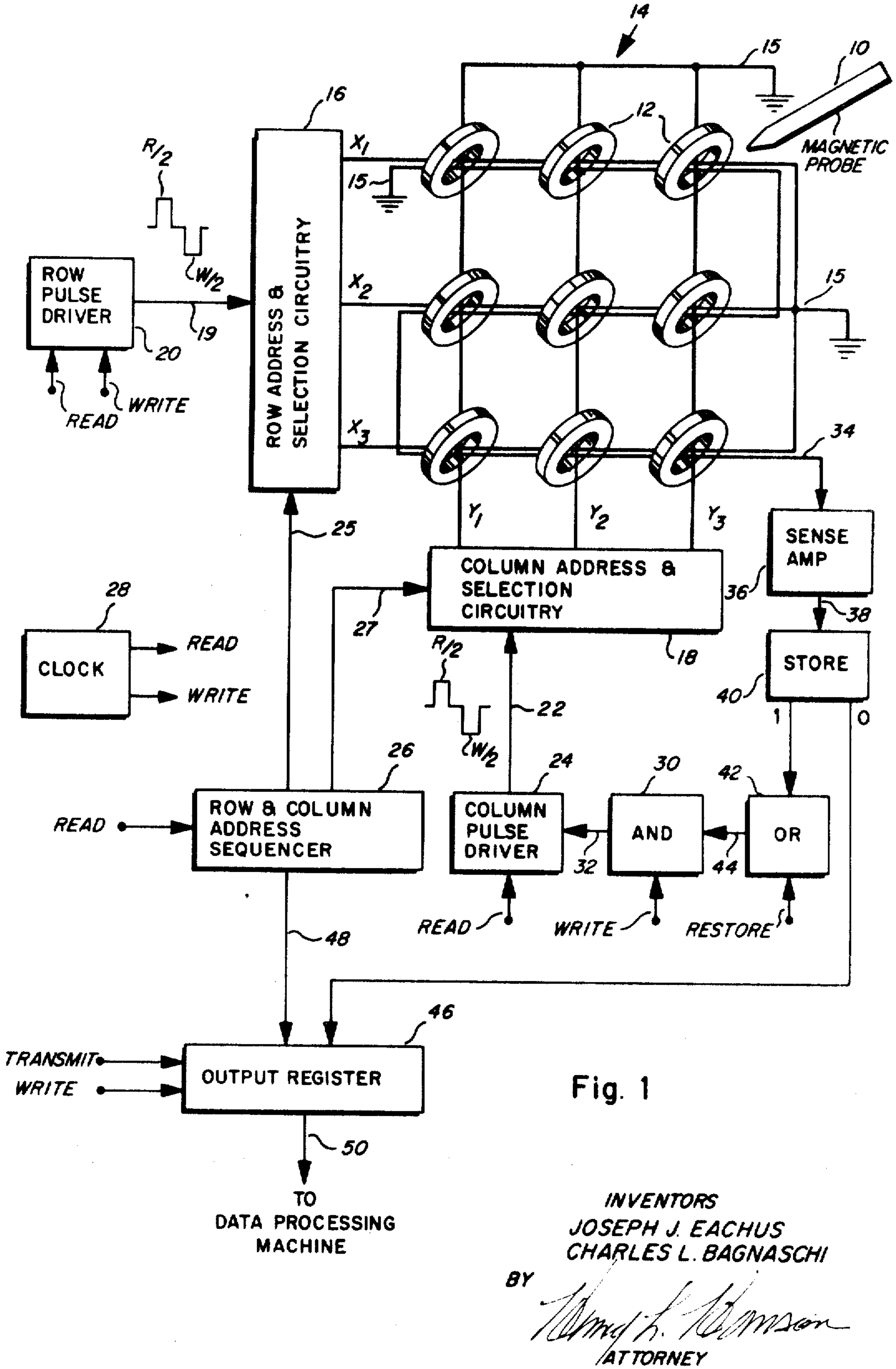
FIGURE 1 is a diagrammatic representation of one manner in which the present invention may be implemented.

Referring first to FIGURE 1, there is shown here a magnetic probe 10 which is adapted to be manually positioned adjacent to any one of a plurality of magnetic cores 12 arranged in an array or matrix 14.

Each of the magnetic cores 12 has a substantially rectangular hysteresis characteristic. Such magnetic cores are capable of remaining in either one of two states of remanent magnetization and of being switched from one of these states to another by the application of a suitably directed magnetomotive force. These properties are common to certain ferrite materials and will not be further described here.

The array 14 of FIGURE 1 is shown as having the core 12 positioned in rows and columns with 3 cores in each. All of the cores of each row are linked by a different one of the three row windings X1, X2 and X3 and all of the cores of each column are linked by a different one of the three column windings Y1, Y2 and Y3. One end of each of the row windings is connected to row address and selection circuitry 16, and the other end is connected to a common reference potential point 15, indicated on the drawing by the conventional ground symbol. One end of each of the column windings is connected to column address and selection circuitry 18 and the other end of each of the windings is connected to the common ground 15.

Each of the row and column address and selection circuitry 16 and 18 respectively has two inputs. A first input 19 is provided on the input to circuitry 16 and is in turn connected to a row pulse driver 20. A first input 22 is provided on the input to circuitry 18 and is in turn connected to a column pulse driver 24. Second inputs 25 and 27 are provided for circuits 16 and 18 respectively and each is connected to a row and column address sequencer 26. Each of the units 16 and 18 may take the form of any well known circuitry such as, for example, a diode decoder which operates to select a desired one of three outputs in accordance with digital inputs from sequencer 26. The row pulse driver 20 and column pulse driver 24 may comprise circuitry similar to that disclosed in Patent 3,119,025 assigned to the assignee of the present invention.

In accordance with coincident current techniques, each of the row and column drivers 20 and 24, when activated is arranged to apply read drive pulse R/2 and write driver pulse W/2 following each other in a repetitive cycle successively to each of the row and column windings. The individual pairs of row and column windings in the array 14 are successively selected in a predetermined sequence in accordance with the digital inputs 25 and 27 applied to circuits 16 and 18 respectively from sequencer 26. The concurrent application of pulses R/2 and W/2 is of sufficient magnitude as to switch each of the cores 12 between its possible states of remanent magnetization. The digital inputs 25 and 27, as mentioned previously, are supplied by row and column address sequencer 26 which may, for example, include a conventional four-stage binary counter in which the first two low order bit positions are connected to be applied to row address unit 16 represented as input 25 and the next two binary bit positions from the other two flip-flops of the counter connected to be applied as input 27 to column selection circuitry unit 18.

Row pulse driver 20 and column pulse driver 24 each hove two inputs. Row pulse driver 20 is connected to receive Read and Write signal inputs from a digital clock 28. Column pulse driver 24 is connected to receive a Read signal input from clock 28 and a Write signal input from clock 28 connected thereto by way of AND gate 30, having an output 32 which is applied as an input to column pulse driver 24. Read and Write signals from clock 28 are connected to be applied as an input to the row and column address sequencer 26 and an output register 46 respectively. Clock 28 may comprise conventional circuitry for generating Read and Write signal outputs in the proper sequence and time relationship so as to be definitive of a memory cycle, that is a read portion followed by a write portion. Either an external source or an internal oscillator may be used to trigger clock 28.

In the apparatus of FIGURE 1, a sense winding 34 links all of the cores 12 of the array 14. One end of the sense winding 34 is connected to an input of a sense amplifier 36 and the other end of the sense winding 34 is connected to the common ground 15. Sense amplifier 36 may include any conventional circuitry which, for example, may take the form of either amplifier and detector combination or may be constructed of circuitry similar to that shown in Patent 3,233,119 assigned to the assignee of the present invention. The output 38 of the sense amplifier 36 is connected to a digital store 40 which may comprise any suitable bistable device capable of remaining in either of two stable states. These states are represented schematically by the "0" and "1" appearing as outputs of the store 40. The set of binary "1" output of store 40 is connected to an OR gate 42 which has as a further input a Restore signal. An output 44 of OR gate 42 is connected as a further input to AND gate 30. The reset or binary "0" output of bistable store 40 is connected to the output register 46 having as further inputs an input 48 from the sequencer 26 and a Transmit signal input. An output line 50 from the register 46 may be connected to any suitable utilization device, i.e. a computer, display device, etc. (not shown).

Figure 2:
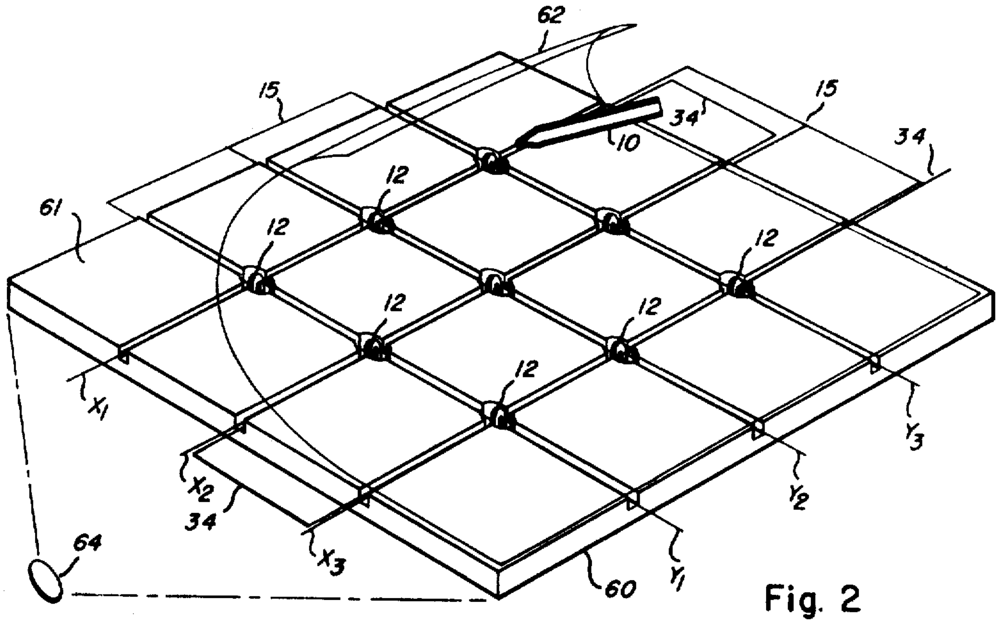
FIGURE 2 is a perspective view of one way in which the array of FIGURE 1 may be fabricated.

Before considering the operation of the apparatus of FIGURE 1, attention is called to FIGURE 2 which illustrates one way in which the array 14 of cores 12 of FIGURE 1 may be constructed in accordance with the teachings of the subject invention. The figure shows a nonconductive transparent Plexiglas board or base member 60 of a predetermined thickness having a viewing surface 61. The surface 61 has been appropriately grooved for the insertion of each of the row windings X1, X2 and X3 and column windings Y1, Y2 and Y3 which are positioned to form a matrix and thereby dividing up the surface 61 into a plurality of different display areas. Cores 12 are positioned at each of the X and Y intersections as shown. Sensing winding 34 passes through all of the cores 12 and is threaded so as to be parallel to each of the row windings X1, X2 and X3, respectively. A thin layer of clear transparent non-conductive Mylar sheet 62 is positioned over the surface 61 which serves both as a protective covering and as a means for holding the cores 12 in place. In the arrangement shown, each of the cores 12 is suitably positioned so as to be individually associated with one of the plurality of display areas identifiable with a number of different items which may be projected onto the board 60 by a projector (not shown) but schematically represented by a projection lens 64. These items may assume any display format, and may, for example as in the case of a merchandising application, correspond to pictorial representations of various catalogue items for customer selection. Read projection is illustrated here and is advantageous in that it allows an operator to work in front of the board 60 without casting shadows on it. Any known type of projection device or similar apparatus for superimposing images onto a projection surface may be used for this purpose and such devices do not form a part of the subject invention.

Figure 3:
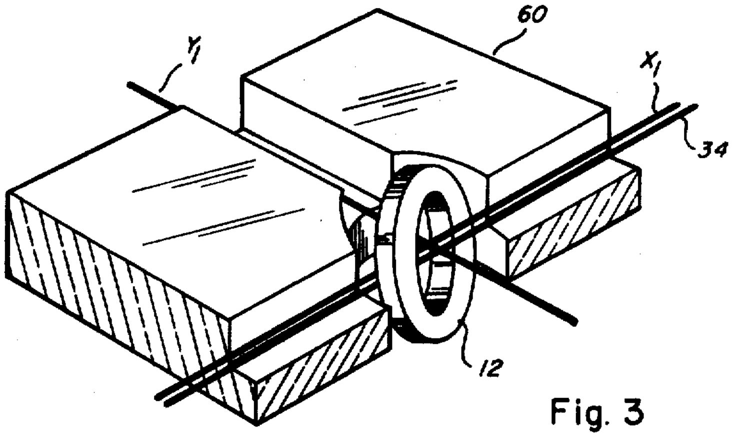
FIGURE 3 shows an enlarged portion of one intersection of the array of FIGURE 2.

FIGURE 3 shows a cutaway portion of board member 60 and the positioning of a particular one of the cores 12 with respect to its row and column windings X1 and Y1 respectively. The sense winding 34 is positioned parallel to row winding X1. The reason for having the winding 34 so thread cores 12 is in order to provide the maximum display area for viewing projected items without the sense winding having a material affect on the projected image. It should be apparent that both the size of the various windings and cores 12 are very much exaggerated for the purposes of illustration. For example, cores having an overall diameter of .05 inch have been successfully employed in the subject apparatus.

DESCRIPTION OF OPERATION

The operation of the apparatus of FIGURE 1 will now be described with reference to FIGURES 1 and 2. The apparatus of FIGURE 1 has particular application as a data entry device wherein an operator desires to make one or more of a plurality of selections identifiable with a plurality of different items projected onto the viewing surface 61. Once a selection is made, digital signals indicative of each such selection will be automatically transferred to a utilization device. The operator may easily make a selection of one or more of the items by simply touching the viewing surface 61 for an instant with the magnetic probe 10 at the place or places corresponding to the positional location of the particular core or cores 12 associated with each of the items as viewed by him through the transparent viewing surface 61.

As previously mentioned, the array of FIGURE 1 basically comprises a plurality of bistable magnetic cores 12 which are adapted to store information relative to a probe selection and be interrogated as to information content using coincident current selection techniques. Each core 12 is uniquely located by a digital address corresponding to the particular row and column in which it is located or positioned. In accordance with the operation of the subject invention, the row and address sequencer 26 is incremented in a cyclic fashion as a consequence of the application of Read signals from digital clock 28 which, for all present purposes, may be considered as free running.

During the intervals of time between the successively occurring Read signals, corresponding to a memory cycle, read drive pulses R/2 and Write drive pulses W/2 are concurrently applied by row and column drivers 20 and 24 respectively, in succession, to each of the cores 12 or array 14 in a predetermined sequence. Both the row and column drivers 20 and 24 respectively, are activated to produce the above mentioned read and write drive pulses in the proper time relationship by the application thereto of the Read and Write signals from the digital clock 28. The particular sequence is established by the sequence of digital addresses applied to row and column selection 16 and 28 by means of inputs 25 and 27 respectively, from sequencer 26.

In the arrangement shown, when a core is in a negative magnetic remanent state, the concurrent application of positive read drive pulses R/2 to its respective row and column windings are effective to switch the core from its initial remanent state to its opposite or positive magnetic remanent state thereby producing an output on sense winding 34 of a magnitude sufficient to produce a signal at the output 38 of sense amplifier 36. The latter is effective to switch bistable store 40 to its binary "1" state. If the magnetic core had already been in its positive magnetic remanent state, it would not be affected by the application of positive read drive pulses R/2 and consequently no output would appear on line 38. During the latter portion of the same memory cycle, the magnetic core will be reset to its initial remanent state by the concurrent application of negative write pulses W/2 from row and column drivers 20 and 24 respectively, the latter column driver 24 being activated in accordance with the state of bistable store 40.

In further explanation of the operation assumed thus far, it should be noted that the store 40 is assumed to be set to the "1" state so that a signal will be coupled through the OR gate 42 to the input 44 of AND gate 30. When the Write input is actuated, a signal will pass through the column driver 24 and then to the column line selected by the circuitry 18. Thus, the core switched in the read portion of the memory cycle will be switched back during the Write portion of the same memory cycle.

In summary, all of the cores 12 in the array 14 will be scanned in sequence with each, in turn, being switched between its two stable states during the memory cycle assigned thereto.

With further reference to FIGURES 1 and 2, the manner of entering selections by an operator will now be described. Prior to entering an item selection into the apparatus of FIGURE 1, it will be assumed that all of the cores 12 of the array 14 have been reset to an initial magnetic remanent state corresponding to a negative remanent state. The latter may be accomplished by the concurrent application of driving pulses W/2 from column and row pulse drivers 20 and 24 respectively, to all of the cores 12 effected by means of a reset button (not shown), which activates the Restore line on OR gate 42. The particular manner in which the apparatus of FIGURE 1 effects the resetting of cores 12 will be later described. Since the magnetic state of a core is sensitive to magnetic fields applied thereto, the placing of magnetic probe 10 adjacent a particular one of the cores 12 will be effective to alter the magnetic remanence thereof. The state of each probe selected core 12, which was reset to the initial remanent state, will be altered such as to have the remanent condition of the core 12 approach zero residual flux. The magnetic probe 10 may be of any construction, limited only in that such probe include either a permanent magnet or an electromagnetic element inserted at the pointing end. It is assumed that the magnet contained within probe 10 produces a magnetic field of sufficient strength to effect the above mentioned change in magnetic remanence when so placed adjacent to each such core. Thus, each of the selected cores 12 will be left in a partially switched remanent state after having been selected by magnetic probe 10 and will remain in this state until interrogated during the read portion of a subsequent designated memory cycle.

As previously mentioned, sequencer 26 is adapted to be continuously incremented in a cycle fashion by the clock 28, and throughout the selection phase there will be applied to the particular co-ordinates of each of the cores 12, in a predetermined sequence, read drive pulses R/2 and write drive pulses W/2 from row and columns drivers 18 and 20 respectively. The write drive pulses W/2 for any particular column are conditionally applied by way of AND gate 30, such condition being dependent on whether or not a particular core 12 has been sensed by the apparatus of FIGURE 1 to have been selected by the probe 10. The particular manner for effecting the latter will now be described in detail. When each of the previously selected cores 12 are interrogated by the concurrent application of read drive pulses R/2 during the read portion of its corresponding memory cycle, the magnitude of the output signal produced as a result of such interrogation in sense winding 34 will be substantially less in contrast to the magnitude of the output signal produced when the core is normally switched between its two magnetic remanent states. This signal will be insufficient to cause sense amplifier 36 to produce an output signal on line 38.

Bistable store 40 is adapted to be switched to its set state or remain in its reset state in accordance with whether or not an output signal on line 38 is present or not. Thus bistable store 40, which may be assumed to be reset at the beginning of each read portion of the memory cycle, is not switched to its set or binary "1" state in the absence of an output signal on line 38 but remains in its reset or binary "0" state. In the absence of the Restore signal, there will be no output signal present at the output 44 of OR gate 42 when bistable store 40 is in its reset condition. Thus, AND gate 30 will not produce an output on line 32 during the corresponding write portion of the memory cycle, thereby effectively inhibiting column pulse driver 24 from generating negative write drive pulse W/2 on line 22 in coincidence with the write drive pulse W/2 on line 19 from row pulse driver 20. This will prevent the particular probe selected core 12 from being switched back to its initial magnetic remanent state.

Since the interrogation process is destructive, the concurrent application of read drive pulses R/2 to the particular core during the read portion of the cycle is effective to switch it from its partially switched or altered remanent state to its positive or opposite remanent state. Consequently, the further concurrent application of read drive pulses, during subsequent memory cycles, will neither cause any further changes in selected cores 12 nor produce output signals on the sense winding 34. Thus, each of the probe selected cores 12 will remain in the second magnetic remanent state until reset back to its initial remanent state. During the write portion of each memory cycle associated with each such selected core, the binary "0" output signal of the bistable store 40 is applied to the output register 46 and is effective to condition the latter for acceptance of the digital address stored in the sequencer 26 during the particular memory cycle. These digital or coordinate addresses are transferred to the output register 46, identifiable with each probe selected core, and indicate the corresponding one or more items which have been selected by the operator.

Those cores 12 not altered by a probe selection will be switched between an initial and a positive magnetic remanent state, upon the concurrent application of positive read drive pulses R/2 from the row and column pulse drivers 20 and 24 respectively. The switching will produce an output signal on the sense winding 34 of a magnitude sufficient to cause the sense amplifier 36 to produce an output signal on the line 38. This output signal is effective to switch the bistable store 40 from its reset or binary "0" state to its set or binary "1" state and thereby producing a further output signal on the output line 44 of OR gate 42. During the corresponding write portion of the same memory cycle associated with each of the unselected cores 12, an output signal will be present at the output 32 of the AND gate 30. This output signal will be effective in each case to activate the column pulse driver 24 to produce a write drive pulse W/2 in coincidence with the write drive pulse W/2 appearing on line 19 which will reset each of the unselected cores 12 back to their initial magnetic remanent state. The bistable store 40 will remain in its binary "1" state and thus no output signal will be applied to the output register 46. Consequently, the corresponding digital addresses of each of the unselected cores 12 will not be transferred thereto.

In summary, only the digital addresses of the probe selected cores 12 will be transferred to the output register 46. By having the selected cores 12 of the array 14 assume an alternate or second remanent state, as a result of probe selection, the apparatus of FIGURE 1 is able to maintain a record of all probe selections. At the completion of the selection phase, the operator may activate a switch or button (not shown) to produce the Transmit signal of FIGURE 1 which will be effective to condition the register 46 for a predetermined time period sufficient to transfer each of the digital addresses of all selected items to the output 50 for receipt by a utilization device. In a merchandising application of the kind previously mentioned, this device, for example, may take the form of a data processing device or machine which will process the received data relative to stored data representing catalogue items and update the files or inventory records of all of such items.

When it has been determined that the operator has made the desired selections, and that all such selections have been successfully transmitted, the operator may activate a reset button (not shown) which will produce the Restore signal as an input to the OR gate 42 for a predetermined period of time. This period will be at least as long as the recycling time of the sequencer 26. The application of the Restore signal to the input of OR gate 42 is effective to produce an output on the line 32 of AND gate 30, independent of the state of the bistable store 40, which will activate the column pulse driver 24. During the write portion of each successively occurring memory cycle, a write drive pulse W/2 will be generated by the column pulse driver 24 concurrently with the write drive pulse W/2 generated by the row pulse driver 20 at the input 19 which will be effective to reset each of the cores 12 back to its initial magnetic remanent state. Upon the complete recycling of the sequencer 26 all of the cores 12 of the array 14 will have been reset. The apparatus of FIGURE 1 will then be ready to accept further probe selections.

While the principles of the present invention have been described and illustrated in terms of particular coincident current addressing and selection techniques, it will be readily apparent that the invention is to be in no way limited to the particular selection or addressing schemes disclosed herein. Neither is the invention to be limited to the particular pulse generating and sensing technique described. It will also be apparent to those skilled in the art that any type of storage element whose electrical characteristic is capable of being modified by a selection operation could be substituted without departing from the teachings of the invention.

While in accordance with the provisions of the statutes, there has been illustrated and described the best forms of the invention known, it will be apparent to those skilled in the art that changes other than those mentioned above may be also made in the apparatus described without departing from the spirit of the invention as set forth in the appended claims.

Having now described the invention, what is claimed as new and novel and which it is desired to secure Letters Patent is:

1. A data entry device for indicating and storing information representative of the selection of one or more of a plurality of possible position selections comprising:

an array of a plurality of bistable storage elements;

a bistable switching sense circuit coupled to each of said storage elements;

bistable switching means connected to said sense circuit and said storage element adapted when activated to switch any bistable storage element in a first bistable state to a second bistable state and, after a predetermined time period, to selectively switch said element back to said first bistable state;

address sequencing means coupled to said bistable switching means and connected to activate said bistable switching means with respect to each of said storage elements in a predetermined sequence;

a storage means connected between said sense circuit and said bistable switching means, being adapted to selectively activate said switching means to reset an associated storage element to said first bistable state only when said associated element has been switched from said first bistable state to said second bistable state;

probe means adapted to be positioned to select any one of said storage elements to partially switch the state of said selected storage element so that the subsequent switching of said storage element by said bistable switching means occurs between its partially switched state and said second bistable state;

means including said storage means and said sense circuit, upon the occurrence of a switching of any selected element from a partially switched state to said second bistable state, connected to inhibit said resetting of said selected storage element to said first bistable state; and output transfer control means connected to said storage means and said address sequencing means to transfer the address of any selected storage element in said array.

2. Apparatus according to claim 1 wherein said storage means includes a bistable means having first and second outputs, said bistable means being connected to be set by said sense circuit upon the switching of any of said storage elements from said first bistable state to said second bistable state, thereby producing a signal at said first output; means connecting said first output to activate said bistable switching means for selectively switching said element back to said first bistable state; said sense circuit being connected to produce a signal on said second output of said storage means upon the switching of any of said storage elements from said partially switched state to said second bistable state; means connecting said second output to activate said output transfer control means to transfer the address of any selected element.

3. Apparatus according to claim 1 wherein said bistable switching means includes means for receiving a restore input signal of a predetermined time duration, said bistable switching means being adapted to be selectively activated during said predetermined time duration to thereby switch all of said probe selected bistable elements back to said first bistable state.

4. A data entry device for indicating and storing information representative of the selection of one or more of a plurality of possible position selections comprising:

an array of magnetic elements;

address sequencing means;

circuit means coupled to said address sequencing means and being adapted thereby, to selectively address each of said elements with first pulses capable of switching the corresponding magnetic element from a first magnetic state to a second magnetic state and, after a predetermined time period, with second pulses to switch said element from said second magnetic state to said first magnetic state;

sense circuit means coupled to each of said storage elements and to said circuit means;

magnetic probe means adapted to be positioned to select any one of said storage elements to partially switch the magnetic state of said selected storage element so that the subsequent switching of said storage element by said circuit means occurs between its partially switched state and said second magnetic state;

means including sense circuit, upon the occurrence of a switching of any selected storage element from a partially switched state to said second state, connected to inhibit the resetting of said selected storage element to said first magnetic state; and output transfer means connected to said sensing circuit and said address sequencing means adapted to transfer the address of any selected storage element.

5. Apparatus of claim 4 wherein said means including said sense circuit comprises a bistable means having a first and a second bistable output, said bistable means being connected to be switched to activate said first output by an output signal from said sense circuit produced only upon the sensing by said sense circuit of the switching of any of said magnetic elements from said first magnetic state to said second magnetic state, said bistable means being connected to be normally in a state for activating said second output so that said second output will be active when the signal from said sense circuit sensing the switching of any of said magnetic elements from said partially switched state to said second magnetic state is insufficient to produce a signal to switch said bistable means to activate said first output; said first output being connected to said circuit means, for adapting the latter to address a magnetic element switched from said first magnetic state to said second magnetic state with said second pulses, thereby restoring said magnetic element to said first magnetic state; and means connecting said second output when active to inhibit the addressing of said magnetic element with said second pulses.

6. Apparatus according to claim 4 wherein said array of magnetic elements are arranged in rows and columns; said circuit means comprises a plurality of row and column conductors, each of said row and column conductors individually linking different ones of said row and columns of magnetic bistable elements; and each of said magnetic elements comprises a bistable magentic core having a rectangular hysteresis characteristic.

7. Apparatus for storing and generating digital information relating to the selection of one or more of a plurality of possible positional selections derived from the interrogation of single units of information comprising:

magnetic bistable elements arranged in co-ordinate rows and columns, each of said bistable elements being initially set to a first one of its bistable states;

a plurality of row and column conductors, each of said row and column conductors individually linking different ones of said rows and columns of bistable elements respectively;

row pulse driving means and column pulse driving means coupled to each of said row and column conductors respectively, each of said driving means being adapted to generate read and write pulses;

address sequencing means for producing a sequence of different row and column address signals, said sequencing means being coupled to said row and column pulse driving means respectively for adapting the latter to selectively apply read and write pulses successively to each of said bistable elements in a predetemined manner, the concurrent application of said read pulses by said row driving and column driving means to each of said bistable elements in said first state, switching said element to a second bistable state, each of said elements switched between said first and said second states being restored to said first state, after a predetermined time period, by the concurrent application of write pulses by said row pulse driving means and column pulse driving means;

bistable switching sense circuit means, said sense circuit being connected to one of said pulse driving means;

a single sense winding linking all of said bistable elements and being connected to said bistable sense circuit means;

magnetic probe selection means adapted, upon having been positioned to select any of said bistable storage elements, to partially switch said selected bistable element from said first state to a state intermediate between said first state and said second bistable state, so that upon the concurrent application of read pulses by said row pulse driving means and column driving means switching said probe selected bistable storage element from said intermediate state to said second bistable state, said sense circuit means being connected upon the occurrence of a switching of any selected storage element from said intermediate state to said second state to inhibit the subsequent concurrent application of said write pulses by said row pulse driving means and column pulse driving means; and output means connected to said sensing circuit and said address sequencing means to transfer the address of any probe selected storage element.

8. A data entry device for indicating and storing information representative of the selection of one or more of a plurality of possible position selections comprising:

a plurality of bistable elements arranged in rows and columns; row and column address and selection means individually coupled to each of said bistable elements in said rows and columns respectively;

address sequencing means coupled to said row and column addressing means, said row and column address and selection means being connected to said sequencing means to selectively switch in a predetermined sequence each of said bistable elements in a first bistable state, between said first bistable state and a second bistable state and, after a predetermined time period, restore said element to said first bistable state;

bistable switching sense circuit means coupled to each of said storage elements;

positionable selection means adapted, when positioned to select any one of said storage elements, to modify the state of said selected storage element wherein the subsequent switching of said storage element occurs between its modified state and said second bistable state, said modification being carried out independently of element selection by said row and column address and selection means, said sense circuit being adapted upon the sensing of the latter modification to inhibit the resetting of said selected storage element to said first bistable state; and output means connected to said sensing circuit and said address sequencing means to transfer the address of any storage element selected by said positionable selection means.

9. Apparatus for indicating and storing digital information relating to the selection of one or more of a plurality of items comprising:

an array of a plurality of bistable storage elements arranged in a predetermined manner such as to be individually associated with the selection of a different one of said plurality of items, each of said bistable storage elements being initially set to a predetermined one of its bistable states;

a bistable switching sense circuit coupled to each of said storage elements;

address selection means being coupled to said sense circuit and to said storage elements;

sequencing means, said sequencing means being coupled to said address selection means and being operative to activate said selection means to select for examination each of said bistable storage elements in a predetermined sequence; said sequencing means further including storage means adapted to store a digital representation unique to each storage element identifiable with a seletced one of said storage elements;

a probe for selecting one or more of the plurality of items through the selection of the corresponding one or ones of said storage elements, said probe being adapted to modify said predetermined state of said one or ones of said storage elements, said modification being carried out independently of element selection by said address selection means; and means including said sequencing means being activated by said sense circuit to transfer the digital representation of each probe-selected element contained therein upon the selection thereof.

References Cited

UNITED STATES PATENTS

| | | | |
|---|---|---|---|
| 3,339,190 | 8/1967 | Kaufman. | |
| 3,337,856 | 8/1967 | Bate et al. | |
| 3,151,316 | 9/1964 | Bobeck. | |
| 3,150,356 | 9/1964 | Newman. | |
| 2,719,965 | 10/1955 | Person. | |
| 2,691,157 | 10/1954 | Williams et al. | 340—172.5 |

GARETH D. SHAW, Primary Examiner

U.S. Cl. X.R.

340—174